United States Patent

Salgado et al.

[11] Patent Number: 5,946,527
[45] Date of Patent: Aug. 31, 1999

[54] IMAGE PROCESSING OF DIFFERENT SIZES OF DOCUMENT SHEETS IN AN ELECTRONIC IMAGING SYSTEM

[75] Inventors: David L. Salgado; James G. Nargi, both of Victor; Kevin F. Aubertine, Ontario, all of N.Y.

[73] Assignee: Xerox Corporation, Stamford, Conn.

[21] Appl. No.: 09/172,504

[22] Filed: Oct. 14, 1998

Related U.S. Application Data

[60] Provisional application No. 60/081,689, Apr. 13, 1998.

[51] Int. Cl.[6] .......................... G03G 15/00; G03G 21/00; B65H 5/22
[52] U.S. Cl. .......................... 399/82; 271/3.01; 271/3.13; 399/85; 399/370
[58] Field of Search ................................ 399/82, 85, 370, 399/376; 271/3.01, 3.13, 265.02

[56] References Cited

U.S. PATENT DOCUMENTS

| | | | |
|---|---|---|---|
| 4,420,149 | 12/1983 | Schultes et al. | 399/85 X |
| 4,834,360 | 5/1989 | Acquavivo | 271/3.04 |
| 4,974,035 | 11/1990 | Rabb et al. | 399/374 |
| 5,387,968 | 2/1995 | Wakikaido et al. | 399/85 X |
| 5,409,203 | 4/1995 | Okamoto et al. | 271/3.01 |
| 5,596,399 | 1/1997 | Dempsey et al. | 399/45 |
| 5,743,522 | 4/1998 | Rubscha et al. | 271/265.02 |
| 5,815,786 | 9/1998 | Isemura | 399/376 |
| 5,839,019 | 11/1998 | Ito | 399/370 X |
| 5,848,320 | 12/1998 | Yaginuma et al. | 399/376 X |

FOREIGN PATENT DOCUMENTS

| | | |
|---|---|---|
| 60-198560 | 10/1985 | Japan . |
| 9-102863 | 4/1997 | Japan . |

*Primary Examiner*—Fred L. Braun

[57] ABSTRACT

In a document feeding and imaging system with a document input tray for sequentially feeding a set of plural document sheets to a document imaging station to be respectively imaged with variable image processing conditions dependent on the size of the document sheet, including a document sheet size measurement system for measuring at least one dimension of the document sheets, wherein the input tray has associated document size measurement sensors, wherein the set of documents loaded into the input tray may be a mixed size set of different sheet sizes or a set of the same sheet sizes; there is provided an operator selectable input for a mixed size set providing a mixed size set control signal which actuates a special prescan document size sensing operational mode for sensing the sheet size as the document is fed past the document imaging station without its being imaged, and then automatically re-feeding that document to the imaging station to be imaged under image processing conditions controlled by the document size signal. If there is no mixed size set control signal, there is a different operational mode assuming a set of the same sheet documents of a size indicated by the document input tray document size measurement sensors. The mixed size set control signal may also provide a user signal restricting the system to a single pre-set pair of related but different size documents.

6 Claims, 4 Drawing Sheets

IMAGE PROCESSING OF DIFFERENT SIZES OF DOCUMENT SHEETS IN AN ELECTRONIC IMAGING SYSTEM

Priority is claimed from U.S. Provisional Application Ser. No. 60/081,689, filed Apr. 13,1998.

Disclosed in the embodiments herein is an improved system for providing for different image processing of sets of document sheets of mixed sizes, vis a vis document sets of the same size document sheets, being inputted to an electronic document imaging system. In particular, there is disclosed a low cost and simple software programmable control system therefor which is compatible with a compact, short path length, automatic document feeder for a digital electronic document imaging system.

It is known in the art that the automatic handling of multi-page or plural sheet sets or jobs of document sheets of different sizes, otherwise known as intermixed sets or jobs, provides various technical challenges. It is also known to be desirable in some situations to provide different image processing of different sizes of documents, even when intermixed within the same job or set. Yet it is also known to be desirable for an automatic document feeder for an electronic document imaging system to be compact, with a short document feeding or path length, which may not provide sufficient upstream path length or space for the document dimension to be measured upstream before the document starts to enter the imaging station to be imaged and image processed.

The following patent disclosures are noted as examples of the above and other such knowledge and difficulties in document handling, etc.: Xerox Corp. U.S. Pat. No. 5,596,399, issued Jan. 21, 1997 to Neil J. Dempsey and Mark H. Buddendeck (D/94125), noting, as to document size detection systems in particular, FIG. 3 and the discussion and other cited references in Col. 8 thereof. Also noted as to document size detection is an allowed commonly assigned U.S. application filed Nov. 14, 1996, as U.S. App. Ser. No. 08/749,305, by Robert F. Rubscha and John D. Gramlich, entitled "Document or Copy Sheet Tray Set Sensor Actuator", Attorney Docket No. D/96554 (now U.S. Pat. No. 5,743,522). Both show a document feeder for an electronic imaging system similar to that in the embodiment herein with a document input tray with two in-tray sensors spaced in the process direction for sensing the length of document sheets in the input tray in the document feeding (process) direction from the upstream end positions of the documents.

However, when a mixed set of document sheets of different lengths is loaded into the input tray, such sensors will not provide correct size information for the different size sheets. The in-tray document length sensors will be triggered by the longest document sheet of the loaded mixed size set if it is near the bottom of the sheet stack, or actuated only by a thick stack of shorter documents underlying one or more longer documents and holding the longer documents above and away from the size sensor.

Likewise, when a mixed set of document sheets of different widths is loaded into the input tray, the side guide setting document width sensors, as in said above-cited U.S. Pat. No. 5,596,399, will not provide accurate size sensing for the mixed set. The side guides will be set to the widest document of the loaded set and thus "fooled" as to smaller documents in that mixed size set.

It will be appreciated that even with an input tray document size sensing system with only two tray document length sensors and only two document width (side guide setting) sensors, as in the example below, that there can be a number of different document size sensor signal logic combinations. There are four different binary on-off signal states, or four size zones, for the two spaced width sensors, and four more for the two spaced length sensors, for 12 possible combinations of those two sets of signals.

Furthermore, some sizes of sheets, such as a standard U.S. letter size (8.5"×11"), or European A4 size, can be loaded by the operator into an input tray and fed either length-wise (a.k.a. "short edge first" or "portrait"), or width-wise (a.k.a. "long-edge first" or "landscape"). I.e., those same size sheets may be rotated 90 degrees in their loading and feeding orientation by the operator. However, typically, depending on the particular document feeder, a standard U.S. legal size document (8.5"×14"), or an 11"–17" document, is only loadable and feedable short edge first.

As to providing different image processing or processing modes for different sizes of documents, there is noted, for example, in said U.S. Pat. No. 5,596,399 the discussion in Col. 7, and other cited references, as to the providing of a different document transport velocity, and thus scanning velocity, through the imaging station for some documents than for others, and/or other different image processing. In particular, a lower document velocity for small documents to be digitally imaged for making enlarged images, so as to avoid loss of image resolution in the digital enlargement. Other differences in imaging or image processing can include the electronic enlargement or reduction of the scanned image being automatically controlled in response to the detected size of the original document, as in so-called "auto-fit" systems to fit the images for printing onto specified or automatically selected copy sheet sizes. The parameters or allowed windows for the document lead and/or trail edge positions may also desirably be automatically changes for different document sizes. E.g., so that the imaging system will assume that the trail edge of the document has been "missed" if it does not pass the imaging station after a preset time period following the lead edge detection. And/or, to ensure that the imaging system background threshold setting is being set only for the area of the document and is not including background imaging of the platen cover or baffle around or behind the document. Also, the "auto-windowing" routine of the imaging system could be changed, such as to smaller windows or less windows, depending on the document size. Document size and thus edge position information can also be used for improved document edge skew detection, binding edge margin shift for duplexing, and other known image processing functions and systems. In the example herein, a mixed size originals mode can be selected and used when certain mixed sizes of originals are loaded into the input tray of the duplex automatic document feeder (DADF) (a.k.a. document handler) and either APS, Auto R/E, Auto Signatures, or Center Image Shift are selected, i.e., one of the different image processing conditions for automatic selection of a paper size, or automatic reduction or enlargement of the image, or automatic signatures printing (a.k.a. "2-up" or "4-up"), and/or shifting of the image positions on the page to change the margins. All of these different image processing modes or conditions are well known per se in the art and need not be re-described herein.

A specific feature of the specific embodiment(s) disclosed herein is to provide in a document feeding and imaging system with a document input tray for sequentially feeding a set of plural document sheets loaded into said document input tray to a document imaging station with a document feeder having a sheet feeding path to be respectively imaged in said document imaging station with variable image processing conditions dependent on the size of said respective said document sheet, including a document sheet size measurement system for measuring at least one dimension of said document sheets, and wherein said document input tray has associated document size measurement sensors, wherein said set of plural document sheets loaded into said document input tray comprises a mixed size set of document sheets of different sheet sizes or a common size set of the same sheet sizes, the improvement comprising; an operator selectable input indicative of said mixed size set of document sheets, said operator selectable input providing a mixed size set control signal, said document feeder and said document sheet size measurement system being actuated by said mixed size set control signal to initiate a special prescan document size sensing operational mode, said special prescan document size sensing operational mode providing, as each said document sheet is fed by said document feeder to said document imaging station, sensing of the sheet size of that individual document sheet to obtain a document size signal without that document sheet then being imaged, and wherein in said same prescan document size sensing operational mode that individual document sheet is then automatically subsequently fed by said document feeder to said document imaging station to be imaged under said variably controlled image processing conditions, said variably controlled image processing conditions being controlled by said document size signal from said document sheet size measurement system for said imaging of that individual document sheet, and wherein if said operator selectable input indicative of said mixed size set of document sheets does not provide said mixed size set control signal, said document feeder and said document sheet size measurement system are actuated initiate a document imaging operational mode assuming said set of plural document sheets loaded into said document input tray comprises a common size set of the same sheet sizes.

Further specific features disclosed herein, individually or in combination, include those wherein said document sheet size measurement system measures said document sheets with said document imaging station when said mixed size set control signal is provided, and measures said document sheets with a sheet size measurement system actuated by said document input tray associated document size measurement sensors when said mixed size set control signal is not provided; and/or wherein said mixed size set control signal provides a user signal restricting said loading of plural document sheets into said document input tray to a single pre-set pair of related but different size document sheets; and/or wherein said document sheet size measurement system comprises two different sheet size measurement operating systems, a first size measurement operating system, including a programmable table of paired orthogonal dimensions of plural different standard document sheet sizes, in which first size measurement operating system only one dimension of a said document sheet is measured, and that one dimension is compared to said table of paired document sheet dimensions to deduce the other, orthogonal, dimension of that same document sheet, and a second size measurement operating system, in which both orthogonal dimensions of said document sheet are measured; and/or wherein said document imaging station is operatively connected to a printing system with a plurality of selectable sizes of printing media substrate sheets, and wherein said variably controlled image processing conditions controlled by said document size signal include the selection of said size of said printing media substrate sheet; and/or wherein said document feeder includes a sheet inverter which inverts that individual document sheet before said imaging of that individual document sheet.

In general, in reproduction apparatus such as stand-alone, remote, or integral image scanners for electronic image storage, and/or xerographic and/or other printers, copiers, or multifunction machines, it is increasingly important to provide reliable and more automatic handling and imaging of the physical image bearing sheets to be scanned in or otherwise imaged. It is desirable to reliably feed and accurately register and image document sheets of a variety and/or mixture of sizes, types, weights, materials, and other conditions, including susceptibility to damage.

The disclosed system may be operated and controlled by appropriate operation of conventional control systems. It is well known and preferable to program and execute document handling, imaging, printing, and other control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software and computer arts. Alternatively, the disclosed control system or method may be implemented partially or fully in hardware, using standard logic circuits or single chip VLSI designs.

It is well known that the control of document and copy sheet handling systems may be accomplished by conventionally actuating them with signals from a microprocessor controller directly or indirectly in response to simple programmed commands, and/or from selected actuation or non-actuation of conventional user interface or remote terminal inputs to provide control signals or commands such as those selecting the number of copies to be made in that job or run, selecting simplex or duplex copying, etc. The resultant controller signals may conventionally actuate various conventional electrical solenoid or cam-controlled sheet deflector fingers, motors or clutches, or other components, in programmed steps or sequences. Conventional sheet path sensors or switches connected to the controller may be utilized for sensing, counting, and timing the positions of sheets in the sheet paths of the reproduction apparatus, and thereby also controlling the operation of sheet feeders and inverters, etc., as is well known in the art.

In the description herein the term "sheet" refers to a usually flimsy physical sheet of paper, plastic, or other suitable physical substrate for images. A "job" is normally a set of related sheets, usually here a collated set of original document sheets from a particular user, or otherwise related. The "original" may of course be a previous copy. A "simplex" document is one having its image and any page number on only one side or face of the sheet, whereas a "duplex" document has "pages", and normally images, on both sides, i. e., each duplex sheet is considered to have two opposing sides or "pages" even though no physical page number may be present. "SA/NKO" in this description refers to a systems administrator or key operator, or a tech rep., i.e., someone with a responsibility and machine software knowledge and/or access beyond that of the normal or ordinary users or operators of the machine, referred to here as the user. GUI is the well known acronym for a graphic user interface, typically the interactive touch screen, display and associated button array, and/or control panel of the machine, or of a remote PC or server networked or otherwise connected thereto providing those input functions and resultant control signals.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the respective art need not be described here.

Various of the above-mentioned and further features and advantages will be apparent from the specific apparatus and its operation described in the example below, and the claims. Thus, the present invention will be better understood from this description of specific embodiment, including the drawing figures (approximately to scale) wherein:

Figure 1:
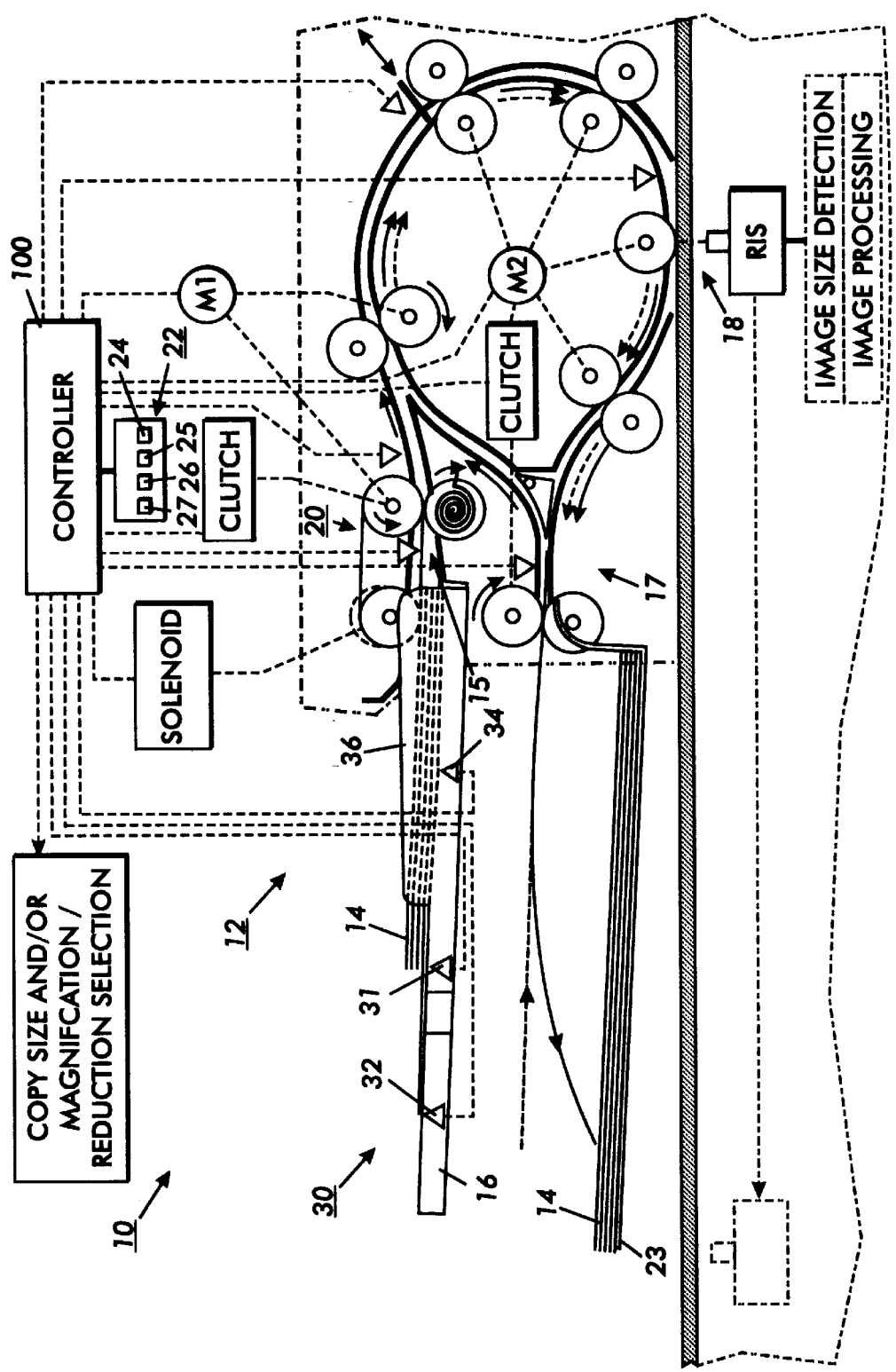
FIG. 1 is a schematic front side view of one embodiment of the disclosed system in an exemplary automatic document handling and imaging system.

Describing now in further detail by way of one example and application of the subject system, there is shown in this exemplary embodiment of the Figures an image processing system comprising a document feeding and imaging system 10 with a duplex automatic document feeder (DADF) 12 for feeding document sheets 14 from its input tray 16 through a looped sheet feeding path 15, with an optionally actuated duplex sheet inverting system 17, to be scanned electronically at an imaging station 18, to provide digital images thereof, as described and shown in the above-cited patents, and as in the Xerox Corporation "Document Center 265 DC" digital copier. The set of documents 14 to be scanned are loaded (stacked) in the document input tray 16 for sequential feeding into the sheet feeding path 15, as shown in FIG. 1, by a sheet separator/feeder 20 and downstream sheet feeders in the sheet feeding path 15 to the imaging station 18. If selected, the inversion system 17 inverts, returns, and images the opposite sides of duplex documents, as is also described in the above-cited patents, and other patents cited therein, The sheet feeding and imaging is under the control of a controller 100 and a connecting or remote GUI 22. After the document sheets are imaged they are outputted and stacked in an output tray 23 here.

Figure 2:
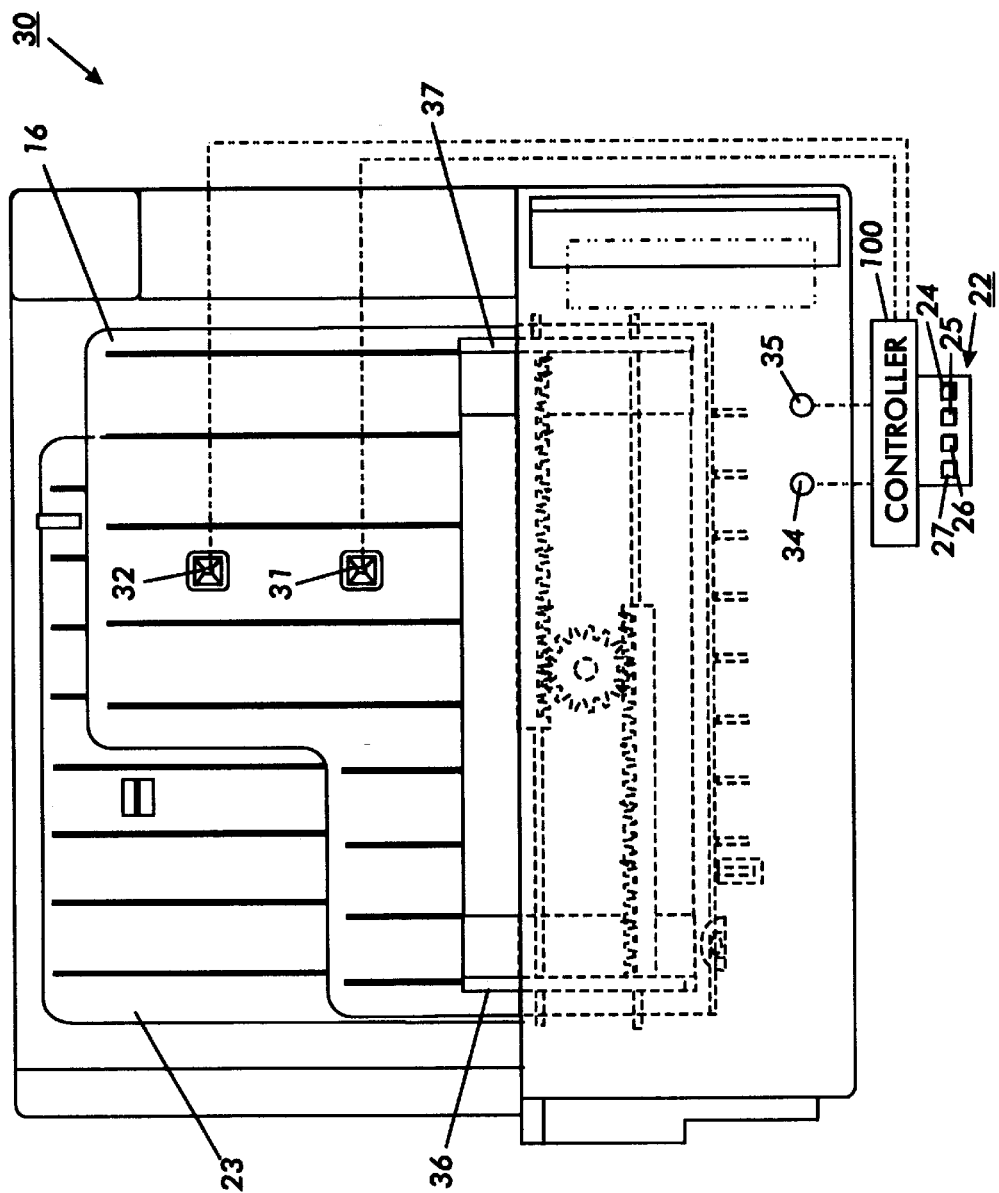
FIG. 2 is a top view of the document input tray per se of the embodiment of FIG. 1, illustrating partially in phantom exemplary document width sensors actuated by the phantom illustrated exemplary rack and pinion linked side guides.
Figure 3:
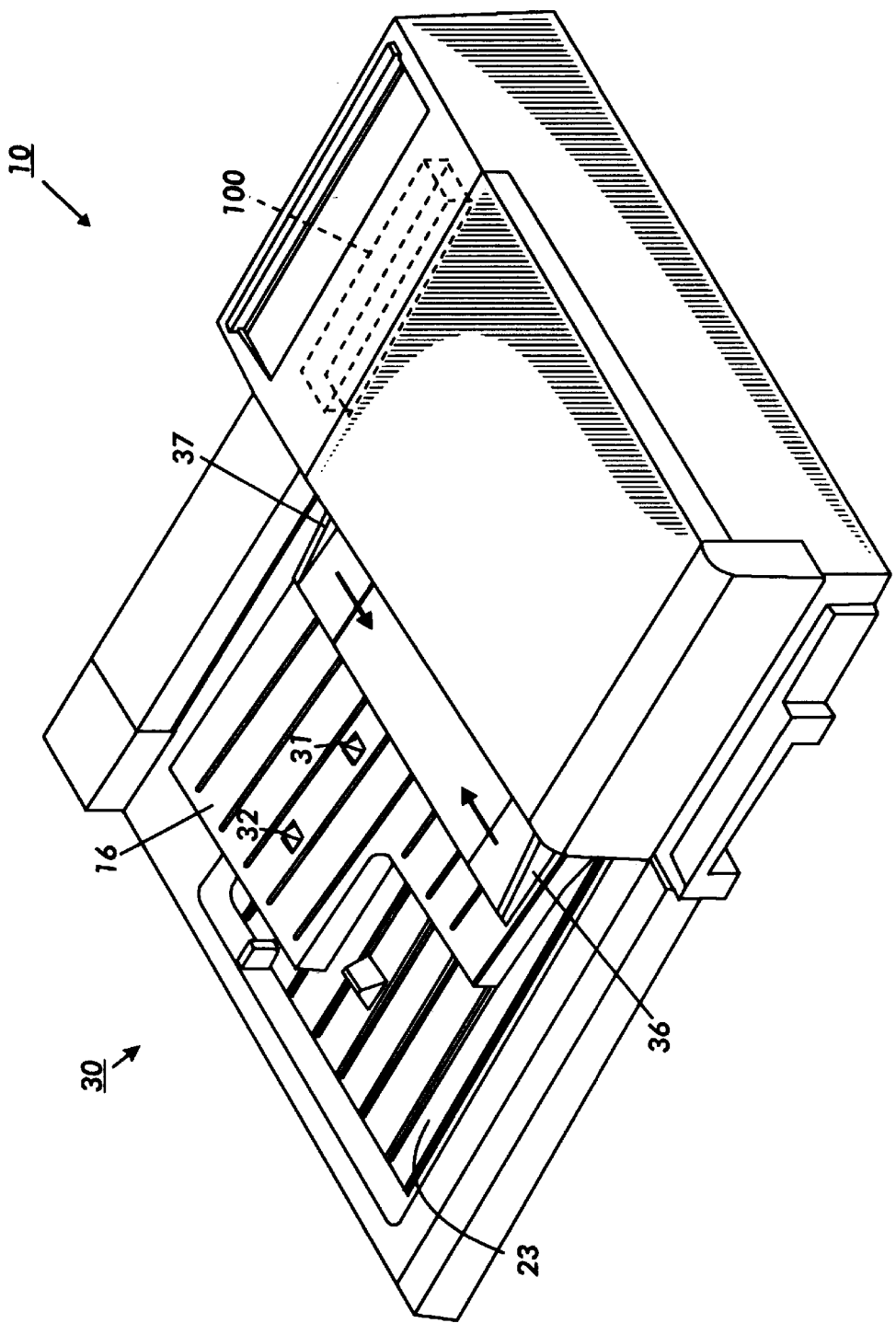
FIG. 3 is a perspective top view of the embodiment of FIG. 1 particularly illustrating two exemplary in-tray document length sensors.
Figure 4:
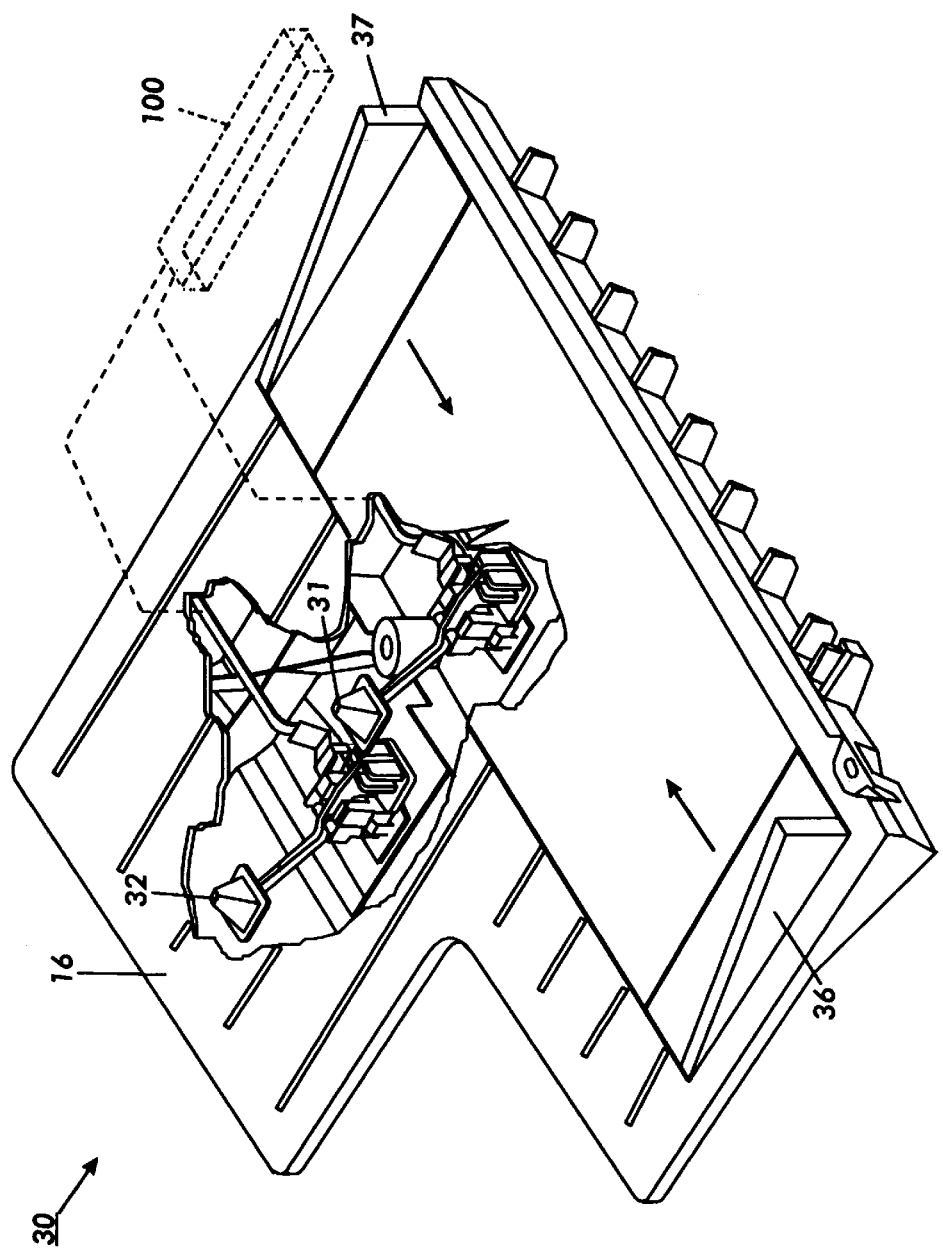
FIG. 4 is a similar view to that of FIG. 3 but enlarged and partially broken away and of the input tray area per se.

The documents 14 may be respectively imaged in feeding through the imaging station 18 with programmable controlled variable image processing conditions, dependent on the size of the respective said document sheet, as will be further described. To this end, the system 10 includes a document sheet size measurement system 30 as previously described above, for measuring or approximating the size of at least one and preferably both orthogonal dimensions of the loaded document sheets. Here in this example the size measurement system 30 comprises (as further described in the above-cited patents) in the input tray the following exemplary document size sensors, in combination: document length sensors 31 and 32 (see FIGS. 3 and 4) actuated by extending upstream end areas of the loaded document sheets overlying none, one or both of those sensors 31, 32; and document width sensors 34 and 35 (see FIG. 2) actuated by the position of the tray 16 repositionable side guides 36 and 37. These side guides 36, 37, for the center registered documents system example shown here, are conventionally ganged together by a dual rack and geared pinion interconnection, as shown, for common movement towards or away from one another about the document feeding path centerline. The side guides setting will be to the dimension of the largest documents loaded therein—the dimension transverse the document feeding path. (For convenience that may be called the document width here, even if the document is loaded long edge first (sideways or landscape mode). Depending on the side guides 36, 37 setting, none, one, or both sensors 34, 35 will be actuated. The maximum amount the side guides 36, 37 may be moved apart may be fixed to the widest documents which are allowed be loaded into the tray 16, that is, stacked in between the two side guides.

The system 10 here allows either a mixed size set of document sheets of different sheet sizes, or a common size set of the same sheet sizes, to be loaded into the document input tray 16. The particular GUI 22 here provides an operator selectable input 24 (which could be an indicated button, switch, touch screen position, or other signal input) indicative of a mixed size set of document sheets, to provide a "mixed size set" control signal to the controller 100.

It will be appreciated that if a user simply dropped a mixed size set of originals into the DADH input tray 16 and pressed "start", with no further input such as the above-described input 24, that the in-tray document size (sheet length and sheet width) sensors (described in the cited patents and herein) would normally have been triggered by, and thus provided measurement signal, indicative of the largest of the sheets in that set. In that case, the controller 100 would, absent any further input at that point in time, assume that all of the documents in that set were of the same size as the largest sheet, and proceed to feed and image process the document sheets according. E.g., if a legal size sheet was detected, the machine would either select legal size paper to print all the document images onto if it were in an automatic paper size selection mode, or, if the machine was in an automatic image size reduction/enlargement percentage "auto-fit" mode, and/or if legal size sheets were not available, the machine would automatically reduce the image size of all the document images to fit onto letter size paper. If this document size assumption was incorrect, due to mixed size originals, this would respectively result in smaller size original images being inappropriately printed on paper that is too large if the "auto paper" mode had been selected, or, all the smaller size original images being printed with inappropriately reduced images if the "auto %" (Auto reduce/enlarge) mode had been selected.

As otherwise noted, a more efficient and accurate "mixed pairs" mixed size originals mode can be selected by user selection of a GUI "Mixed Size Originals" input such as 24, so labeled, and user restriction to certain (allowed) mixed sizes of documents, as described below. Intermixed size originals may loaded into the input tray 16 of the DADF 12. The operator selects the "mixed size originals" input 24 on the GUI 22, to input a mixed size signal to the controller 100. Preferably, this feature selection also requires one of the following special image processing modes 25, 26 or 27 to also be selected from the GUI, i.e., another input signal for a selected image processing mode, such as Auto paper (APS), Auto reduce/enlarge (R/E), or Auto Center (automatic shifting of the image to the center of the page or copy sheet). A "mixed pairs" mode of more efficient imaging of mixed originals may then be provided, providing the following GUI 22 displayed user restrictions are followed, for this particular operating mode: The loaded originals must all have the same width, and must be "paired". E.g., only allowing loading the input tray 16 with the following sheet size and sheet orientation combinations: short edge first loading and feeding of either 8.5"×11" documents or 8.5"×14" documents, or, long edge loading and feeding of either 8.5"×11" documents or 11"×17" documents. If not (if other documents or orientations are loaded and fed), the system 10 will subsequently sense, from its electronic imaging, an invalid document size and present a warning message on the GUI 22 to that effect. If the above "paired" loading restrictions are followed, the system 10 will allow automatic intermixed sizes document feeding, electronic document size measurement from the electronic image of the edges of the document captured at the document imaging station 18, rather than from the tray 16 document size measurement system 30, previously described. Document imaging, and document image processing in the proper, selected, mode, can be conducted without further manual user input or manual document reloading or other handling.

The above restriction to same width originals in the same mixed size set is primarily to ensure non-skewed feeding. Intermixing narrower documents which would not be engaged by or confined between the side guides to prevent skewing as those sheets are being fed could cause them to feed in skewed, especially with a center-registered document feeder (document handler) as in this example 12.

To further avoid the need for any manual reloading of the intermixed sizes document set after the above-described document size measurements of the mixed size originals at the imaging station 18, with the system 10, the documents may be automatically sequentially fed in and slew-scanned past the imaging station 18 one at a time for detecting the document length, by detecting only the document sheet edges, without capturing the image on the document at that time. Then, instead of outputting that document sheet in the output tray 23, that same document sheet may then be automatically reversed in the sheet inversion system 17 in the sheet feeding path 15 and fed back to image its opposite side, if it is a duplex document (so indicated by user GUI input), or, if it is a simplex document, the same document sheet may be feed around the loop of the sheet feeding path 15 again, in a second slew cycle, inverted again, and then fed around again the loop path a third time to be imaged, and then ejected to be stacked in the output tray 23. And so forth, for each subsequent document in the mixed document set. Thus, no further manual handling of the mixed size document set is required, even though (if this additional feature is used) the first pass of all the documents through the imaging station 18 is a size measuring pass, not an imaging pass, and the documents must all be re-fed at least once more to the imaging station 18 for actual imaging.

As another possible alternative, to improve the first copy out time, especially for simplex documents, when mixed size originals copying is selected on the GUI by the user, the DADH may be restricted to only one scanning speed, but a limit on the amount of allowed digital image magnification imposed, to retain image quality, such as by displaying the smallest document size which may be intermixed with the sensor-indicated largest document loaded. In that manner, smaller documents may be intermixed for feeding with larger documents more readily for certain imaging modes, and avoid having to make a nonimaging pass (slew cycle) of the mixed documents through the imaging station 18 to measure their size.

To express this in other words, disclosed here is a system 10 and method for feeding and imaging mixed sized originals (MSO) (different sizes of originals within the same input stack, set or job of plural original sheets) in a digital scanner, copier or multifunction machine. In a special MSO mode of operation here, a special scan sequence can be run to determine the input size of the documents, and scan the images, here with user input control over this feature. Here, the user selects the MSO feature, loads the DADH 12 input 16 with different size originals, and the system 10 will automatically determine each original size and properly process that original accordingly.

Optionally, the user may additionally be provided, by a software addition to the system 10, a further option of choosing, for and after that mixed size originals (MSO) input selection, either a limited, "size pairs", comparison, or a "full" size comparison. That is, a choice between a "known pairs" assumption and input limitation, as described above, and a "prescan" actual size determination in which all the documents are fed to the imaging station and individually measured electronically, before the start of the image scanning of any of the documents of the mixed size set.

"Known pairs" here means the system has a programmed software or non-volatile memory (NVM) stored set of valid, allowed, MSO pairs of allowed paired sizes (of a limited number). When the known pairs mode is selected, then, based on the largest size detected by the DADH size sensors, the system will assume what the other size is, based on a look-up of that pre-programmed allowable pair in memory. For example, assume the system administrator (SA) has programmed the particular machine or networked system for a known pair of U.S letter size and U.S. legal size paper (8.5"×11" and 8.5"×14"). If MSO mode program is selected and the in-tray document size sensors system 30 detects the loading in of legal size paper, this known pairs system will assume that all smaller size documents also loaded into the input tray therewith are the other, paired, size, which is letter size in this example. The user will have been informed from the GUI 22 that the allowable input is so limited.

Whereas, if the other, or full size determination, mode was selected by the user, any combination of mixed document sizes are allowed to be loaded and fed, but then the original sizes must be individually measured electronically at the imaging station 18, looking electronically for the edges of the documents, in a pre-scan or slew cycle, before starting the actual imaging of any of the documents in that set.

Preferably, the SA/KO or user can control the pairing of input sizes allowed to be scanned in for a mixed size job. The SA/KO or user can preset the system in the controller 100 to specify the set of mixed size originals input "size pairs" for a DADH size zone. That allowed pairing can be preset for a particular country or a particular customer. Or, the user can be allowed to override this MSO setting for a particular job. That is, to change which pairs of documents are allowed for a particular imaging or copying job. For example, the system could be set to a default known pair of 8.5"×11" and 11"×17" size document sheets, but allow the user to specify a job of a pair of A4 and A3 size document sheets.

While the embodiment disclosed herein is preferred, it will be appreciated from this teaching that various alternatives, modifications, variations or improvements therein may be made by those skilled in the art, which are intended to be encompassed by the following claims.

What is claim is:

1. In a document feeding and imaging system with a document input tray for sequentially feeding a set of plural document sheets loaded into said document input tray to a document imaging station with a document feeder having a sheet feeding path to be respectively imaged in said document imaging station with variable image processing conditions dependent on the size of said respective said document sheet, including a document sheet size measurement system for measuring at least one dimension of said document sheets, and wherein said document input tray has associated document size measurement sensors, wherein said set of plural document sheets loaded into said document input tray comprises a mixed size set of document sheets of different sheet sizes or a common size set of the same sheet sizes, the improvement comprising;

an operator selectable input indicative of said mixed size set of document sheets, said operator selectable input providing a mixed size set control signal, said document feeder and said document sheet size measurement system being actuated by said mixed size set control signal to initiate a special prescan document size sensing operational mode, said special prescan document size sensing operational mode providing, as each said document sheet is fed by said document feeder to said document imaging station, sensing of the sheet size of that individual document sheet to obtain a document size signal without that document sheet then being imaged, and wherein in said same prescan document size sensing operational mode that individual document sheet is then automatically subsequently fed by said document feeder to said document imaging station to be imaged under said variably controlled image processing conditions, said variably controlled image processing conditions being controlled by said document size signal from said document sheet size measurement system for said imaging of that individual document sheet, and wherein if said operator selectable input indicative of said mixed size set of document sheets does not provide said mixed size set control signal, said document feeder and said document sheet size measurement system are actuated initiate a document imaging operational mode assuming said set of plural document sheets loaded into said document input tray comprises a common size set of the same sheet sizes.

2. The document feeding and imaging system of claim 1, wherein said document sheet size measurement system measures said document sheets with said document imaging station when said mixed size set control signal is provided, and measures said document sheets with a sheet size measurement system actuated by said document input tray associated document size measurement sensors when said mixed size set control signal is not provided.

3. The document feeding and imaging system of claim 1, wherein said mixed size set control signal provides a user signal restricting said loading of plural document sheets into said document input tray to a single pre-set pair of related but different size document sheets.

4. The document feeding and imaging system of claim 1, wherein said document sheet size measurement system comprises two different sheet size measurement operating systems, a first size measurement operating system, including a programmable table of paired orthogonal dimensions of plural different standard document sheet sizes, in which first size measurement operating system only one dimension of a said document sheet is measured, and that one dimension is compared to said table of paired document sheet dimensions to deduce the other, orthogonal, dimension of that same document sheet, and a second size measurement operating system, in which both orthogonal dimensions of said document sheet are measured.

5. The document feeding and imaging system of claim 1, wherein said document imaging station is operatively connected to a printing system with a plurality of selectable sizes of printing media substrate sheets, and wherein said variably controlled image processing conditions controlled by said document size signal include the selection of said size of said printing media substrate sheet.

6. The document feeding and imaging system of claim 1, wherein said document feeder includes a sheet inverter which inverts that individual document sheet before said imaging of that individual document sheet.

* * * * *